Figure 23:
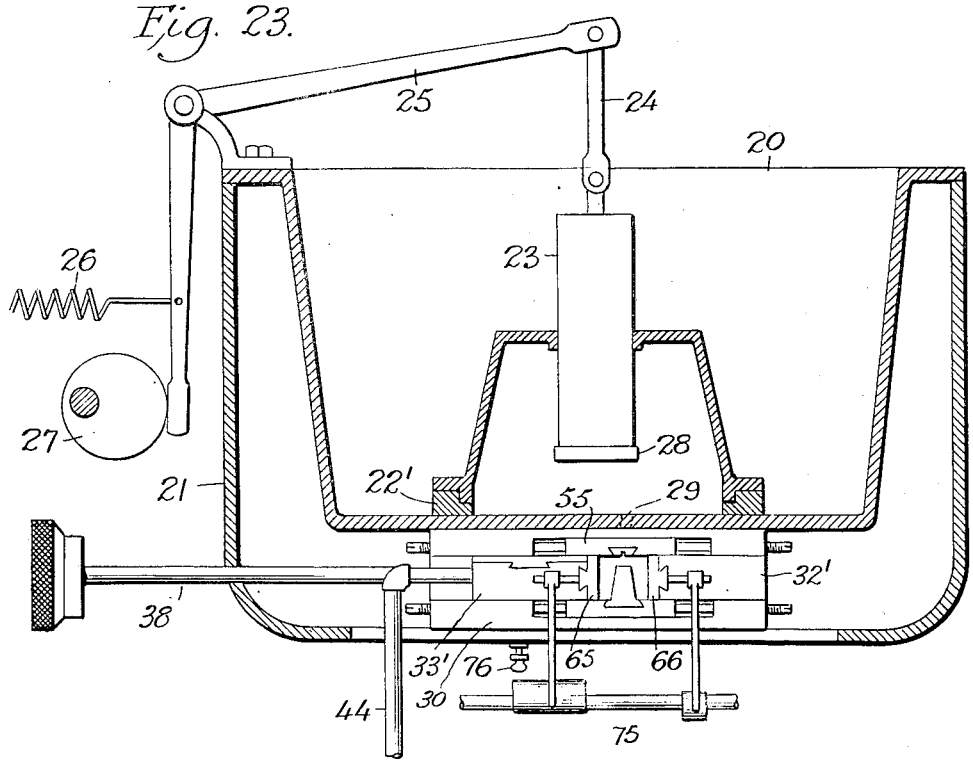

Feb. 13, 1934.  G. H. M. DAHL  1,946,488
MACHINE FOR MAKING PRINTERS' LEADS AND RULES
Filed Feb. 1, 1929   6 Sheets-Sheet 1
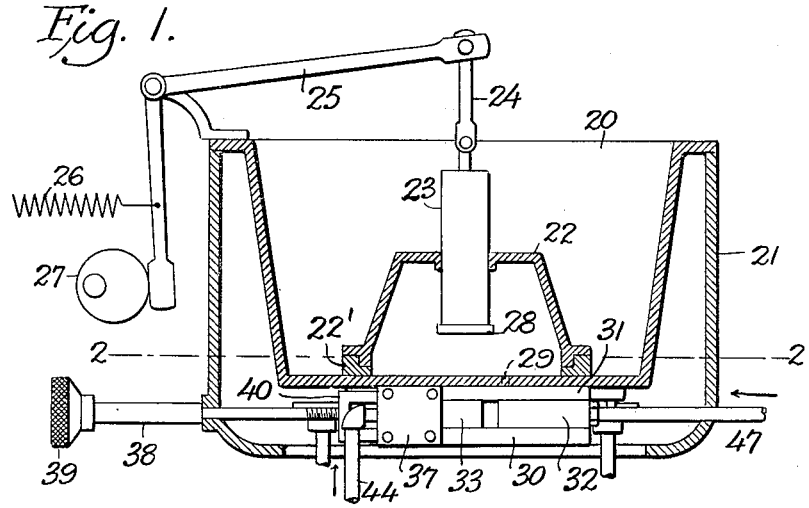
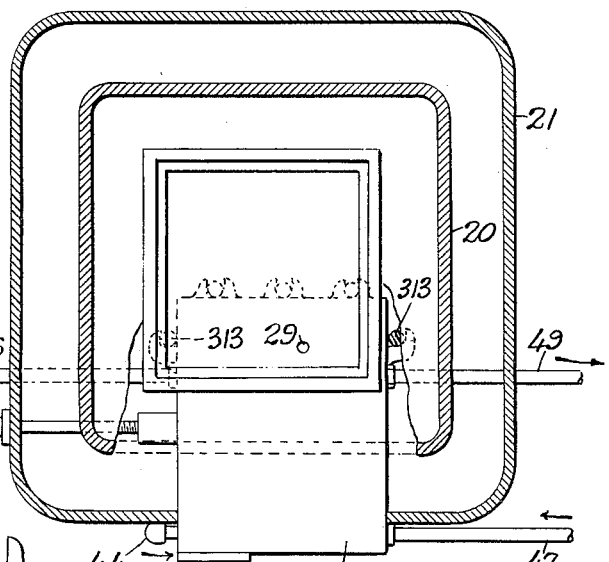
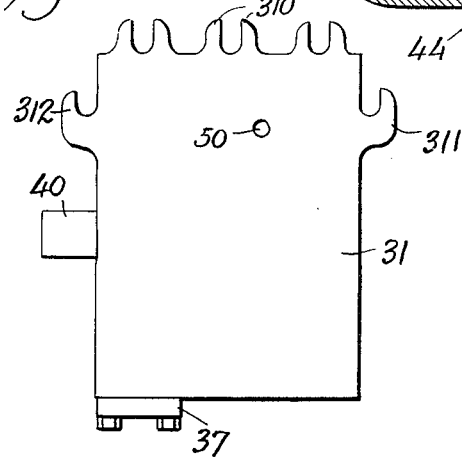
INVENTOR.
George H. M. Dahl,
BY
ATTORNEY.

Feb. 13, 1934.    G. H. M. DAHL    1,946,488
MACHINE FOR MAKING PRINTERS' LEADS AND RULES
Filed Feb. 1, 1929    6 Sheets-Sheet 2
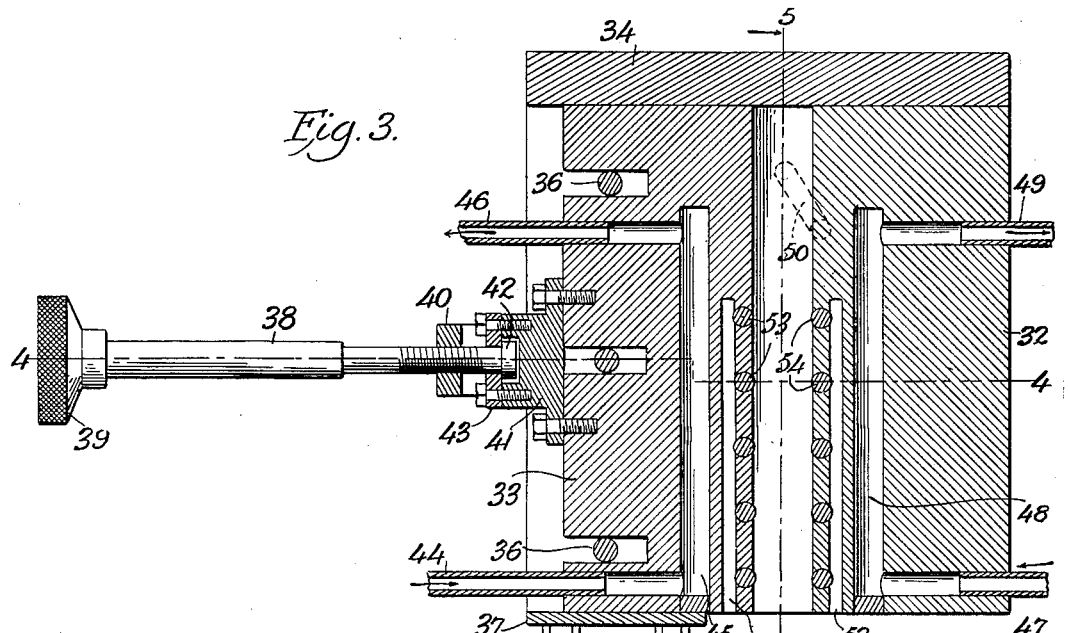
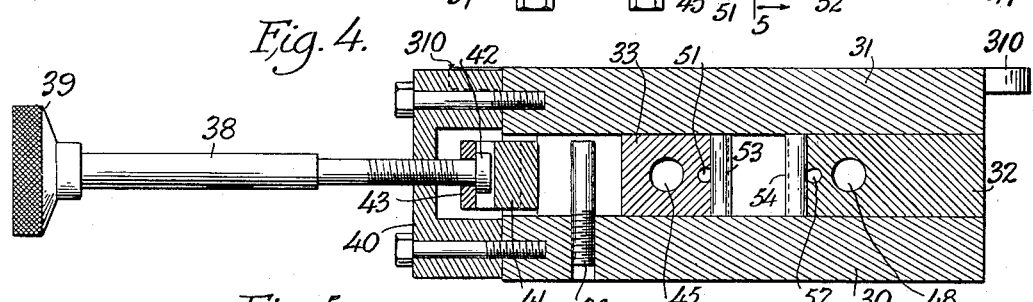
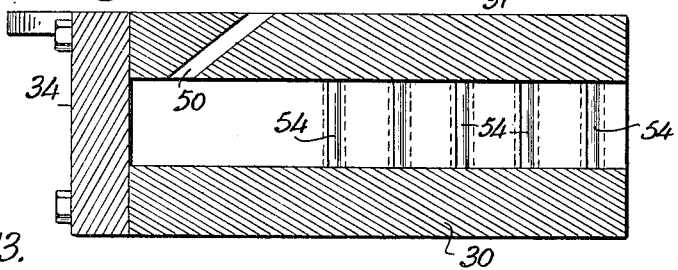
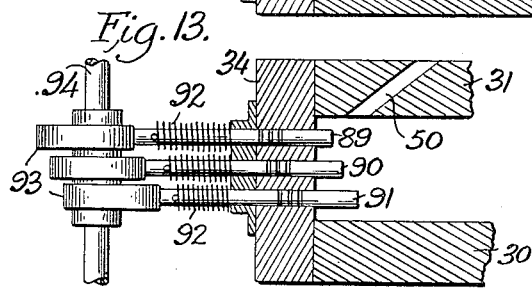
INVENTOR.
George H. M. Dahl,
BY
F. W. Dahm,
ATTORNEY.

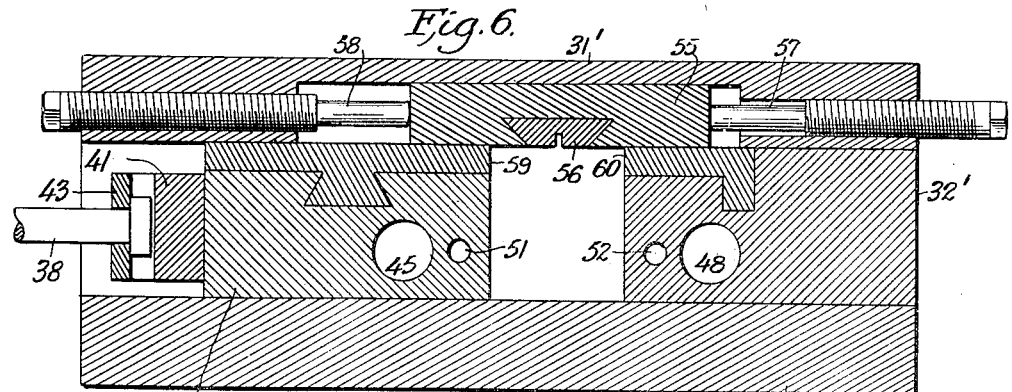
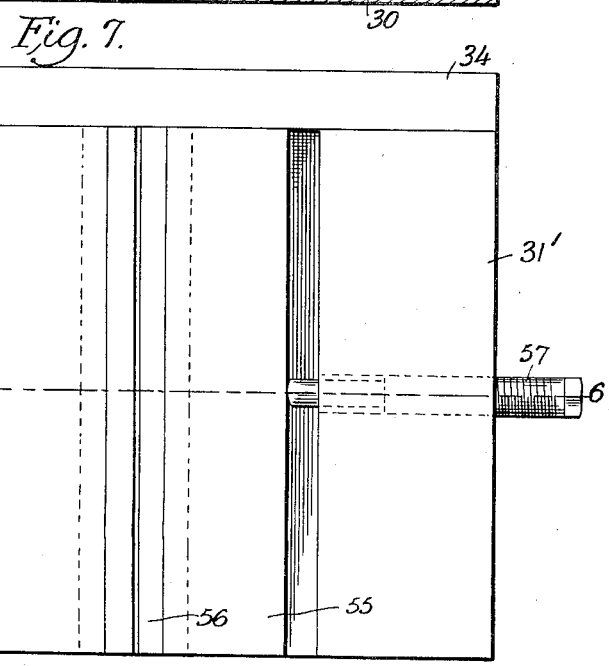
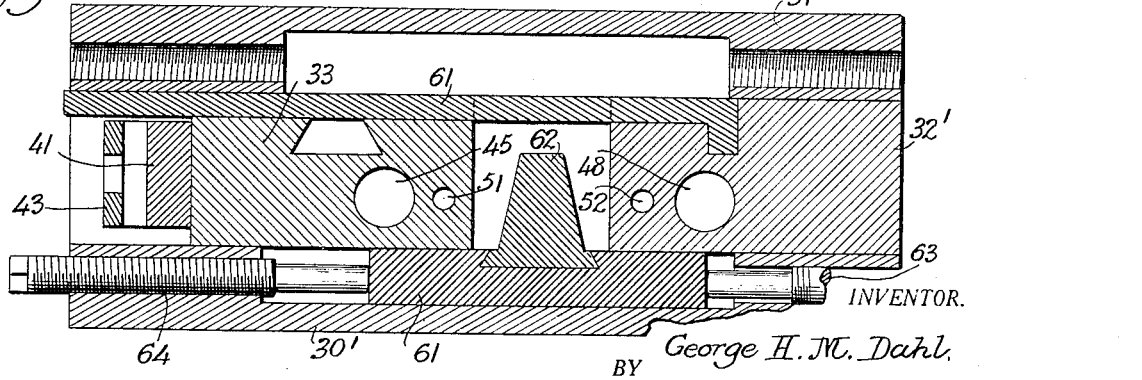

Feb. 13, 1934.    G. H. M. DAHL    1,946,488
MACHINE FOR MAKING PRINTERS' LEADS AND RULES
Filed Feb. 1, 1929    6 Sheets-Sheet 4
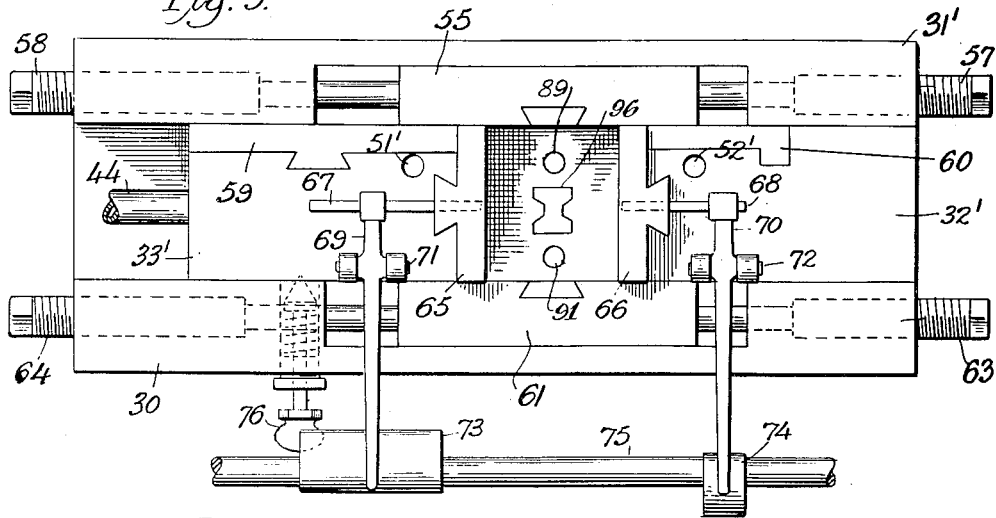
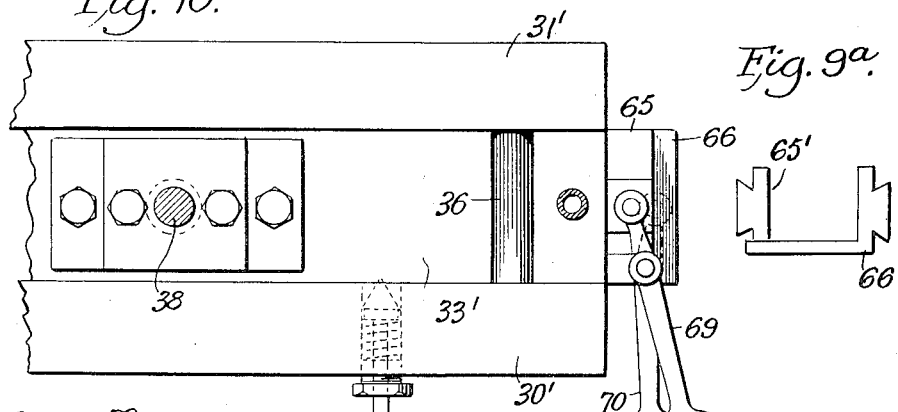
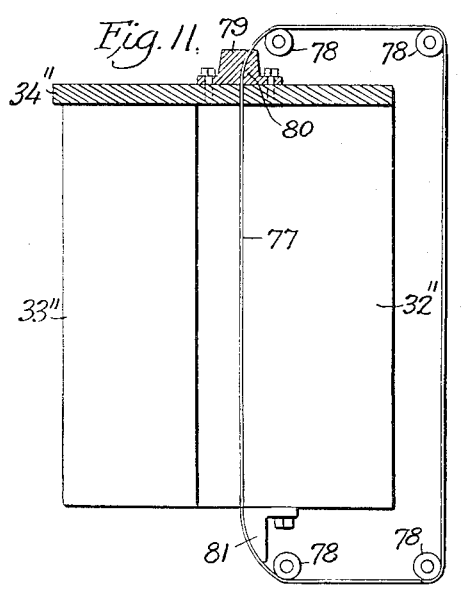
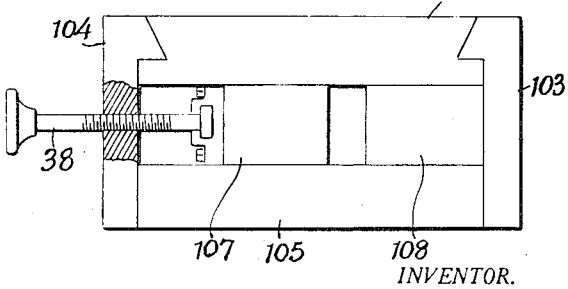
INVENTOR.
George H. M. Dahl,
BY
F. W. Dahl,
ATTORNEY.

Feb. 13, 1934.   G. H. M. DAHL   1,946,488
MACHINE FOR MAKING PRINTERS' LEADS AND RULES
Filed Feb. 1, 1929   6 Sheets-Sheet 5
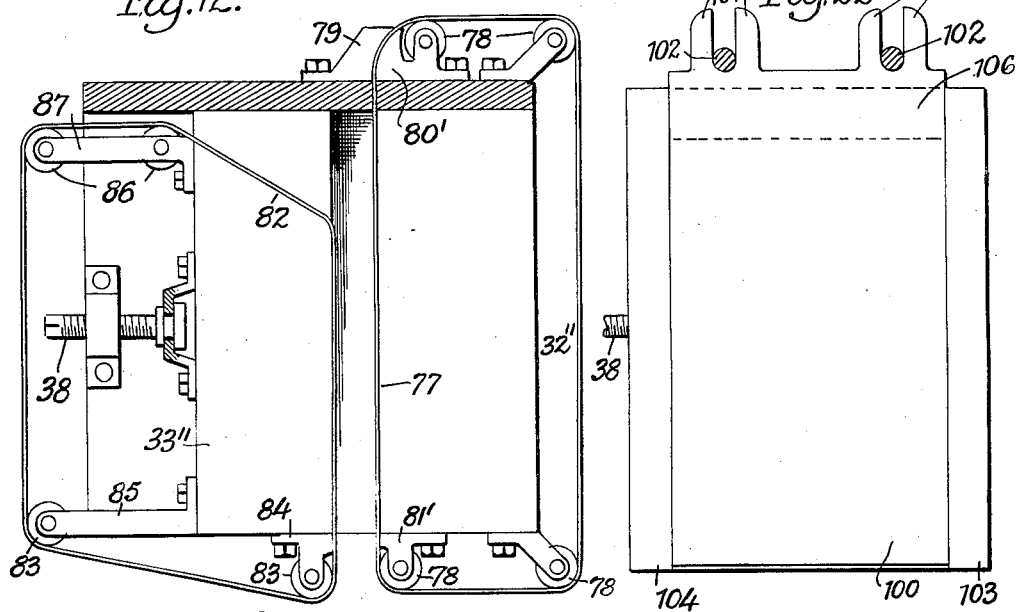
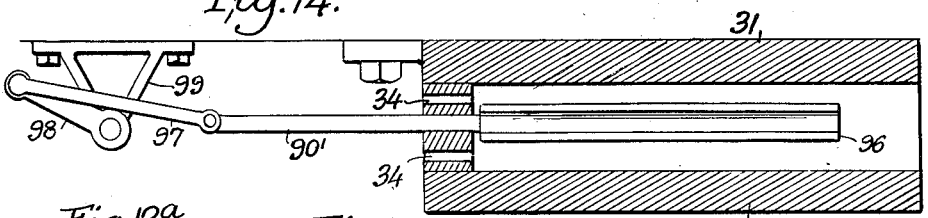
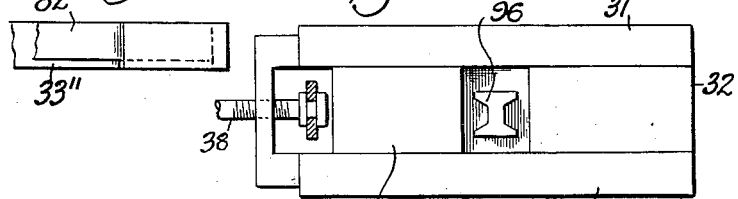
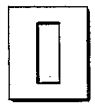 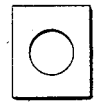 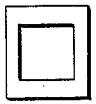  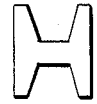
Inventor
George H. M. Dahl,
By
Attorney Feb. 13, 1934.   G. H. M. DAHL   1,946,488
MACHINE FOR MAKING PRINTERS' LEADS AND RULES
Filed Feb. 1, 1929   6 Sheets-Sheet 6

Inventor
George H. M. Dahl,
By
Attorney

Patented Feb. 13, 1934

1,946,488

UNITED STATES PATENT OFFICE 1,946,488

MACHINE FOR MAKING PRINTERS' LEADS AND RULES

George H. M. Dahl, Washington, D. C.

Application February 1, 1929. Serial No. 336,832

35 Claims. (Cl. 199—1)

My said invention relates to a mold intended primarily for use in a machine for casting printers' leads, rules and furniture in a continuous operation, as in my Patent 1,671,088, though obviously adapted for use in other relations and for other purposes. It is an object of my invention to provide a mold in which the continuous flow of metal shall be facilitated so as to afford smooth faces on the strip which is being formed and to avoid irregularities in the speed of movement of the work due to adhesion of the metal to the mold.

Another object of the invention is to provide a mold with means for varying the formation of the strip as by forming a fin on the printing surface of a lead or by hollowing out the top or bottom of a lead of substantial thickness, so as to reduce the weight of the product and the amount of metal used in making the same.

Another object of the invention is to provide a horizontal, or substantially horizontal molding passage in a machine for making a continuous strip of uniform texture without weak points at intervals in its length, such as have occurred in machines previously known in the art for making such strips by an intermittent feeding action.

In the drawings, which are made a part of this application and in which similar reference characters indicate similar parts, Figure 1 is a vertical section of a machine of the character indicated, Figure 2, a horizontal section of the same on line 2—2 of Figure 1, Figure 2a, a detail of a part shown in Figure 2, Figure 3, a horizontal section through the material, Figure 4, a vertical section of the mold on line 4—4 of Figure 3, Figure 5, a vertical section of the mold on line 5—5 of Figure 3, Figure 6, a vertical section of a modified form of the mold; on line 6—6 of Figure 7, Figure 7, a bottom plan of the top member of the mold shown in Figure 6, Figure 8, a vertical section of modification, Figure 9, an end elevation of a modified form, Figure 9a, a detail of a modified form of devices shown in Figure 9, Figure 10, a side elevation of said modified form, Figure 11, a horizontal section of modification, Figure 12, a horizontal section of a modification, Figure 12a, a side elevation of a block shown in Figure 12, Figure 13, a vertical section of another modification, Figure 14, a vertical section of still another modification, Figure 15, an end elevation of said modification, Figures 16 to 20, details of strips or slugs such as may be formed by the devices of my invention, Figure 21, an end elevation, partly in section, of another modification, Figure 22, a top plan of Figure 21, and Fig. 23, a vertical section of the machine showing, in combined relation, certain features shown separately in other figures.

In the drawings reference character 20 indicates an open pot such as is shown in my patent above referred to, said pot having a housing 21 open at the bottom to admit a heating coil. An inverted dome-like member 22 rests on a flanged annulus 22' secured to the bottom of the pot. Pistons (not shown) in cylinders 23 extend into the closed chamber under the member 22, said pistons being operated by connecting rods 24, bent levers 25, springs 26 and cams 27 and being provided with floating valves 28, all of which are as in my patent above referred to.

A port 29 leads through the bottom of the pot to the mold which consists essentially of a bottom member 30, a top member 31 having claws 310, 311, 312 engaging bolts 313 projecting from the bottom of the pot, a fixed side member 32, a movable side member 33 and a rear member 34. The movable member is guided by upright pins 36 passing through parallel slots in said member and secured to the bottom member 30 and said member is held in place by a plate 37 (Figure 3). A rod 38 having a knurled head 39 has threaded engagement with a yoke 40 secured at its ends to the top and bottom parts respectively. Said rod has a head 42 engaging behind a yoke plate 43 secured to block 41 which in turn is fixed to the movable member 33, rotation of the rod serving to move the member 33 in or out to vary the thickness of the strip being cast.

Cooling means is provided for the mold, said cooling means consisting in an inlet pipe 44 for cooling fluid leading to a passage 45 in member 33, and an outlet pipe 46 communicating with the end of the passage 45 nearest to the source of hot metal. The direction of movement of the cooling fluid is indicated by the arrows. The fixed member 32 is also provided with cooling means consisting in an inlet pipe 47 leading to a passage 48 from which the fluid is carried off by an outlet pipe 49.

The port 29 in the bottom of the pot communicates with a passage 50 in the top member of the mold (Figures 3, 5 and 13) and the molten metal, hardening as it moves along the molding passage, has its movement facilitated in Figure 3 by means of rollers 53 and 54 mounted in apertures impinging on the molding passage to such an extent that the rollers may contact at their periphery with the passing strip of hot metal. The material of the rollers is such that normally when the mold is cool they are loose in their base but when the mold is heated they will expand to such an extent as substantially to fill the apertures so as to prevent any of the metal from escaping but still not fitting so tight as to interfere with their rotation. To further facilitate their rotation they are lubricated by means of oil entered in any convenient manner into oil passages 51 and 52. Each of these passages extends along the rear side of said rollers, the apertures in which the rollers are journaled opening into said passage at the rear side, or the side remote from the molding passage.

In Figures 6 to 8 I have illustrated means for varying the conformation of the upper and/or lower faces of the strip being formed. For this purpose I have shown in Figure 6 the top member 31' as being hollowed out to receive a transversely adjustable device 55, having an undercut groove for an insert 56, here shown as having a longitudinal groove whereby an upwardly extended fin is provided on the strip being cast. Screws 57 and 58 threaded in top member 31 provide for ready adjustment of the device 55 and parts carried thereby which obviously may be of various forms to produce different shapes in the printing face of the strip or in the top face of a strip being cast for other uses. The mold member 32' has its upper left hand corner cut down to receive an L shaped member 60 and the mold member 33' is reduced in height and provided with a dove-tailed groove for securing in position a member 59, the parts being otherwise as previously described. It will be seen that the insert 56 can be adjusted so as to bring its groove to the middle of a strip being cast regardless of the thickness of the strip or to bring it to a position other than midway between the sides of the strip. In Figure 8 I have illustrated one method whereby the top of the strip can be made flat by substituting a member 61 for the two parts shown at 59 and 60 in Figure 6. In this figure the bottom member 30' is hollowed out to receive a support 61 adjustable transversely of the molding passage by screws 63 and 64, said member carrying a core 62 whereby the strip being formed may be hollowed out at its under side so as to reduce the weight of the strip and the amount of metal used in the making. Obviously a similar but oppositely directed core might be arranged to depend into the molding passage in place of the insert 56 whereby the strip would be hollowed out at the top or two such devices could be arranged, one above and the other below the strip, so as to form a strip with a sort of X-shaped cross section, and other forms can be made such as will be obvious to those skilled in the art.

In Figure 9, I have illustrated a form of the invention in which the top and bottom members 30 and 31 are as in Figure 8 but the side mold members 32' and 33' are provided with dove-tailed grooves at their inner faces to receive sliding face-plates 65 and 66, said face-plates having dove-tailed projections entering said dove-tailed groove and being provided at their outer ends with pins 67 and 68 entering apertures in levers 69 and 70 pivoted 71 and 72 respectively, said levers at their free ends engaging cams 73 and 74 on a shaft 75. It will be seen that as the shaft rotates the levers are moved in opposite senses to slide the face-plates in opposite directions back and forth along the face of the forming strip thereby exerting a smoothing action on such face and reducing the tendency of the strip to adhere to the face of the mold. It will be noted that the oil passages 51' and 52' are located above the dove-tailed grooves in the side members of the mold to give the best lubricating action. A spring pressed pin 76' is indicated as positioned to engage apertures in the slidable mold member 33' for securing the same in place, the function of this pin being similar to the function of pins 62 in my above mentioned patent, but the apertures being spaced for point sizes in making leads and rules. A modified form of the sliding members is shown in Figure 9a, where the member 66' extends across the bottom of the molding passage, and the member 65' is correspondingly reduced in height. Other forms will readily suggest themselves to those skilled in the art.

In the modified form of Figure 11, I have shown in a mold with a rear member 34", a movable member 33" and a fixed mold member 32". The face of the fixed mold member bearing against one side of the strip being cast is formed by a moving band 77 passing about a series of rollers 78 one or more of which may be positively driven by means (not shown) to cause the band to travel. At the side where the band enters the mold it is supported by two blocks 79 and 80 and at the exit side it is guided by a single block 81 to cause it to enter freely and smoothly into the mold. Its movement assists the movement of the forming strip and also tends to smooth the adjacent face of such strip.

Figure 12 illustrates a form of my device in which two moving endless bands are used instead of a single band as in Figure 11. The band 77 is similar to the band in Figure 11 and is similarly supported, except that the guide blocks 80' and 81' have rollers 78 mounted thereon. The band 82 passes around rollers 83, 83, 86, 86, one or more of which are positively driven to cause the band to travel, the rollers being supported respectively on brackets 84, 85 and 87 and the bracket 84 being formed to serve as a guide at the outgoing end of band 82. These brackets are all supported on block 33", as the band must move in and out with the block when the same is adjusted. As shown in Figure 12a the band 82 preferably does not extend to the bottom of block 33".

Figure 13, illustrates a mold provided at the rear end with a series of pushers 89, 90 and 91 bearing at their inner ends against cams 93 on a shaft 94 and illustrated for convenience as being pressed outward by cams on a shaft 94 and illustrated for convenience as being pressed outward by springs 92. In case the use of springs in proximity to the mold is found impracticable by reason of the heat other means will be substituted for those shown at 92 and in connection with the pin 76 (Fig. 9). For example such devices as shown in Figure 14 (hereinafter described) may be used to operate the pushers, and a screw stud or the like may be substituted for pin 76. The function of the pushers is to aid to some extent in the continuous forward movement of the metal in the molding passage by their continuous pushing action.

Figures 14 and 15 illustrate a modified function for one or more of the pushers of Figure 13, a shaper or core 96 with a stem 90' of the same cross-section as those of the pushers being substituted for one of the pushers. It will be evident that such a core may be located in the middle opening in place of pusher 90 for the purpose of forming a hollow strip or slug with a longitudinal central opening of any desired form. With a core such as shown in Figures 14 and 15 the central opening will have the shape of the letter H lying on its side thus I. Other forms of hollow slug are illustrated in Figures 16, 17 and 18 and it will be obvious that many other forms can be made. The shaper is shown as being reciprocated by means of a connecting rod 97 and a crank 98 supported on a bracket 99. Such plungers as shown at 89 and 91 may be used simultaneously with the shaper 96 or some such shaper as that shown at 62 may be reciprocated by the lower plunger in combination with one or both pushers 89 and 90. The holes receiving the pushers may of course be stopped up when desired. Similarly such a shaper may be supported in the groove on the upper transversely adjustable member 55 (Figure 9) and may be reciprocated by such means as previously described. It is also within the purview of my invention to utilize two shapers in place of the two pushers 89 and 91. A slug such as shown in Figure 19 may be formed by the use of a shaper somewhat similar to that illustrated at 62 in Figure 8 and a slug such as shown in Figure 20 may be formed by the use of upper and lower shapers of somewhat similar form to that shown in Figure 8.

In Figures 21 and 22 I have illustrated another form of my device in which the top plate 100 is intended to be secured to the bottom of the pot by means of claws 101 engaging screws 102 or by any other suitable means. The side walls 103 and 104, the bottom wall 105, the rear wall 106 (shown in dotted lines in Figure 22), and the blocks 107 and 108, together with other appurtenances carried thereby, are all reciprocated during the formation of the strip by any suitable means, as for example by means of a cam and a lever such as illustrated in Figure 10, or by a crank as in Figure 14.

It will be obvious to those skilled in the art that various other modifications may be made in my device without departing from the spirit of my invention, and, therefore, I do not limit myself to what is shown in the drawings and described in the specification but only as set forth in the appended claims.

I claim:

1. A machine for making printers' leads, rules and furniture comprising a melting pot, a closed chamber therein, a demountable mold immediately underneath the pot, a horizontal molding passage in the mold communicating with the closed chamber by way of a port extending directly through the bottom of the pot to a straight-line passage registering at one end with said port and merging at the other end with said horizontal passage and means for forcing the molten metal in a continuous flow from said chamber through said passage.

2. In a continuous flow machine for molding metal, a mold having a molding passage from which the metal emerges in solid form, means for feeding molten metal through said passage in a continuous stream, and mechanical means between the metal and a wall of the passage for reducing friction between the cooling metal and said wall.

3. In a continuous flow machine for molding metal, a mold having a molding passage, means for feeding molten metal through said passage in a continuous stream, and rollers fitting loosely in apertures impinging on the molding passage the coefficient of expansion of the material of the rollers being such that they will be expanded in the operation of the machine sufficiently to prevent escape of molten metal.

4. A device as in claim 3, with means for supplying lubricant to said rollers.

5. In a continuous flow machine for molding metal, a mold having a horizontal molding passage, means for feeding molten metal through said passage in a continuous stream, upright rollers arranged in apertures in side members of the mold so as to impinge on the metal in the mold, an oil passage at the side of each set of rollers remote from the molding passage, and passages for cooling fluid beyond said oil passages.

6. A machine for casting strips for printers' leads and rules and the like including a mold comprising top, bottom and side members, and interchangeable devices for varying the conformation of the strip being cast, said top and bottom members being formed to support said devices.

7. A device as in claim 6, with means on said top and bottom members for adjusting said devices transversely of the mold.

8. A machine for making printers' leads, rules and furniture comprising a melting pot, a closed chamber therein, a mold immediately underneath the pot, a horizontal molding passage in the mold communicating with the closed chamber directly through the bottom of the pot, means for forcing the molten metal in a continuous flow from said chamber through said passage, and pushing means in connection with said mold for assisting the movement of metal through said passage.

9. A machine for making printers' leads, rules and furniture comprising a melting pot, a closed chamber therein, a mold immediately underneath the pot, a horizontal molding passage in the mold communicating with the closed chamber, means for forcing the molten metal in a continuous flow from said chamber through said passage, members on the mold contacting with opposite sides of the strip being formed, and means for moving said members relatively to said strip and to each other.

10. In a device for shaping fluid metal, means defining a passage in which the metal is shaped, a melting pot communicating with said passage, upper and lower wall members adjustable transversely of said passage, and interchangeable means carried by said members for varying the shape of the upper and/or lower faces of a strip being formed in said passage.

11. An extrusion apparatus comprising opposed side walls for forming a flat-sided strip, a support at another longitudinal face of the strip, and an interchangeable device carried by said support for varying the contour of said face of the strip.

12. A device for forming printers' leads, rules and furniture comprising a melting pot, a passage communicating with the pot, fixed top, bottom and side members defining said passage, an adjustable side member, means for adjusting said side member, and gauging and holding means independent of the adjusting means for locating said adjustable side member at point intervals.

13. A device for forming printers' leads, rules and furniture comprising a melting pot means for feeding molten metal continuously and uniformly to said mold, a passage communicating with the pot, fixed top, bottom and side members defining said passage, an adjustable side member, means for adjusting said side members to vary the thickness of the strip being formed, gauging and holding means for locating said adjustable side member at point intervals, said device forming a strip with flat faces at opposite sides, and means for varying the conformation of another face of the strip said means being adjustable transversely of the strip.

14. A device for forming printers' leads, rules and furniture comprising a melting pot, a passage communicating with the pot, fixed top, bottom and side members defining said passage, an adjustable side member, means for adjusting said side member to vary the thickness of the strip, gauging and holding means for locating said adjustable side member at point intervals, said device forming a strip with flat faces at opposite sides, means for varying the conformation of another face of the strip said means being adjustable transversely of the strip, and a removable device for shaping the face farthest from said transversely adjustable means, said removable means serving to vary the height of the strip.

15. An extrusion apparatus comprising a melting pot, a mold communicating therewith said mold having a passage in which the fluid metal is shaped, a member contacting with a side of the forming strip between said strip and a wall of said passage, and means for continually moving said member unidirectionally longitudinally of the strip being formed.

16. An extrusion apparatus comprising a melting pot, a mold communicating therewith said mold having a passage in which the fluid metal is shaped, members contacting with opposite sides of the strip being formed, and means for continually reciprocating said members in opposite directions to each other.

17. A device for shaping fluid metal including a passage, means for supplying fluid metal thereto, interchangeable plungers mounted at the entry end of said passage, one or more of said plungers serving as shapers to shape the strip being formed while the other plungers feed the metal along the passage, and means for reciprocating said plungers.

18. A device for shaping fluid metal including a mold having a molding passage, means for supplying fluid metal thereto, endless bands having runs between walls of said passage and the adjacent faces of a strip being formed, and means for moving the bands continuously during the operation of the device.

19. A device for shaping fluid metal including a molding passage, means for supplying fluid metal thereto, and endless band movable along between a wall of said passage and the adjacent side of a strip being formed, and means for moving the band lengthwise of the strip.

20. An extrusion apparatus comprising opposed side walls for forming a flat-sided strip, and means at another face of the strip for varying the conformation of said face said means being adjustable transversely of the strip.

21. A device for shaping fluid metal comprising a passage, means for supplying fluid metal thereto, a plurality of plungers at the entry end of the passage, and means for reciprocating the plungers in timed relation to feed the metal along the passage in a continuous flow, substantially as set forth.

22. In a continuous flow machine for molding metal, a mold having a molding passage from which the metal emerges in solid form, means for feeding molten metal through said passage in a continuous stream, mechanical means between the metal and a wall of the passage for reducing friction between the cooling metal and said wall, said means comprising cylindrical antifriction rollers journaled in the walls of the passage, and oil passages leading to said rollers.

23. A machine for casting printers' leads, rules and furniture comprising a mold having an open end and side walls, said mold having another wall member removable through the open end of the mold, and a removable insert in an undercut slot in said wall member for varying the conformation of the adjacent face of the strip being formed.

24. A machine for casting printers' leads, rules and furniture comprising a mold having an open end and side walls, said mold having another wall member removable through the open end of the mold, and a removable insert in an undercut slot in said wall member for varying the conformation of the adjacent face of the strip being formed, said wall member being adjustable transversely of the strip.

25. In a continuous strip casting machine, a mold having a molding passage, an inlet between the closed and the open ends of said passage, and pushing means operating in the chamber between the closed end and the inlet for expediting the movement of the metal through said passage.

26. In a continuous strip casting machine, a mold having a molding passage, means at opposite sides of the mold for smoothing such sides, and means for moving said means relatively to the strip independently of each other.

27. In a continuous strip casting machine, a mold having a molding passage, means at opposite sides of the mold for smoothing such sides, and means for moving said means relatively to the strip and to each other.

28. In a continuous strip casting machine, a mold having a molding passage, means at opposite sides of the mold for smoothing such sides, and means for reciprocating said smoothing devices in opposite directions lengthwise of the strip being formed.

29. In a device for making printers' leads, rules and furniture, a mold closed at the sides, top and bottom, means for adjusting a side wall to determine the thickness of the strip, and independent means for setting the wall at point intervals.

30. In a device for making printers' leads, rules and furniture, a mold closed at the sides, top and bottom, means for adjusting a side wall to determine the thickness of the strip, independent means for setting the wall at point intervals, comprising recesses in said adjustable member at point intervals, and a spring-pressed pin for engaging said recesses.

31. In a flat-sided continuous strip-forming mold, a molding passage having top, bottom and side walls, means for adjusting a side wall to vary the thickness of the strip, gauging and holding means for locating said adjustable member at point intervals, and means for varying the conformation of another member of the strip, said last-named means being adjustable transversely of the strip.

32. In a continuous extrusion device for a flat-sided strip, a mold having a passage for shaping fluid metal, rigid side walls for said passage, a member between a side wall and the adjacent face of the forming strip, and means for continually moving said member unidirectionally lengthwise of the forming strip.

33. In a machine for making printers' leads, rules and furniture in a continuous strip, a mold open at one end, a passage leading to said mold, a movable side member for said mold, adjusting means engaging said side member for changing the thickness of the strip without interrupting the molding operation, means for varying the conformation of another face of the strip, and means for adjusting said last-named means transversely of the mold.

34. A machine for casting printers' leads, rules and furniture and the like including an open-ended stationary mold having side walls for shaping a continuously moving strip with flat sides, an insert fixed to another wall of the mold, said insert having means for varying the conformation of another face of the strip being formed, and means for feeding fluid metal continuously to said mold.

35. In a continuous flow machine for molding metal, a mold having a molding passage, means for feeding metal through the passage in a continuous stream, anti-friction means at the sides of the mold, and pushing means operating at a point remote from the outlet end of the passage for assisting the movement of the metal through said passage.

GEORGE H. M. DAHL.